Feb. 11, 1958

C. F. AMBROZ 2,823,009

DAMPING SHOES FOR WICKET GATES USED ON REVERSIBLE PUMP-TURBINE

Filed May 28, 1956

Inventor
Charles F. Ambroz
by Howard B. Scheckman
Attorney 2,823,009

DAMPING SHOES FOR WICKET GATES USED ON REVERSIBLE PUMP-TURBINE

Charles F. Ambroz, Milwaukee, Wis., assignor to Allis-Chalmers Manufacturing Company, Milwaukee, Wis.

Application May 28, 1956, Serial No. 587,820

7 Claims. (Cl. 253—122)

This invention relates to a hydraulic, reversible pump-turbine, and more particularly to an arrangement for facilitating its operation as a pump.

A reversible pump-turbine is really a single hydraulic machine which operates in one direction as a turbine and in the reverse direction as a pump. A direct connected electrical machine serves as a motor for pump operation and as a generator for turbine operation.

Water drives the unit as a turbine generator, adding energy to an electrical system during peak demand period. During off peak periods, when surplus power is available from other plants, the unit operates as a motor driven pump to lift water back into the reservoir.

A reversible pump-turbine has movable wicket gates around the impeller runner to control the flow of water in each direction. Units with wicket gates give higher efficiency when pumping. As the storage reservoir is filling, the head will increase and the quantity of water pumped decrease; as the quantity changes, the wicket gates can be adjusted to provide the proper flow for best efficiency.

A reversible pump-turbine is similar in appearance to a Francis type turbine. The rotor is positioned in the center of the turbine. One end of the rotor is coupled to the motor generator, and the other end carries an impeller.

The impeller is supported to rotate in the plane of the wicket gates, which surround the impeller.

When the pump-turbine operates as a turbine, fluid enters through a penstock, passes down into a spiral casing surrounding the wicket gates, and is guided by the wicket gates against the impeller of the rotor spinning the impeller to generate power.

When the pump-turbine operates as a pump, electricity from other plants flows back to the generator motor, which now turns the impeller in a reverse direction to pump fluid back up the penstock to the reservoir.

During the operating period when a pump-turbine functions as a pump, vibration due to torsional flutter of the wicket gates may occur.

Although the wicket gates are linked to a central gate operating ring by means of levers and connecting links, clearances in the gate operating mechanism and flexibility of the various components is sufficient to allow objectionable vibration to take place.

An object of this invention is to provide a damping device acting directly on damping surfaces provided on the wicket gate shafts to decrease vibration due to torsional flutter of the wicket gates.

Another object of this invention is to provide a damping device which will lock rigidly against the damping surfaces provided on the wicket gate shafts to restrain rotation in either direction.

A further object of this invention is to provide a damping device which is self-centering.

Other objects and advantages will appear from the following description considered in conjunction with the attached drawing, in which.

Figure 1:
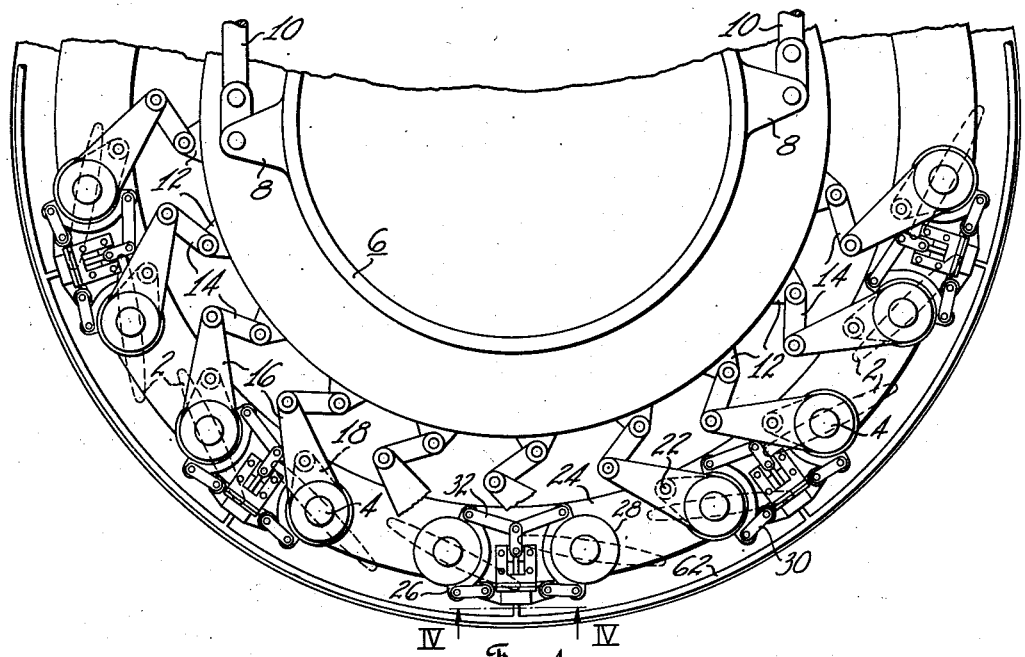
Fig. 1 is a plan view of a portion of the pump-turbine showing the damping devices, their relationship to the wicket gates, and the mechanism which moves the wicket gates.

Referring to Fig. 1 wicket gates 2 are provided with wicket gate shafts 4 (Figs. 1–4) so the wicket gates can be rotated to various positions for best efficiency. The wicket gate shafts are rotated by a gate operating ring 6 (Fig. 1). The gate operating ring has a flange 8 projecting from each side. Pivotally connected to each flange is a connecting rod 10 which rotates the gate operating ring to change the position of the wicket gates. Each connecting rod is moved by a conventional servomotor (not shown) which may be in turn operated by a conventional governor (not shown). Gate operating ring 6 carries a plurality of flanges 12, which pivotally carry a plurality of gate links 14. Each gate link 14 is in turn pivotally connected to one end of a shear lever 16. The other end of each shear lever loosely receives the wicket gate shaft, so the shear lever can rotate relative to the wicket gate shaft. Each wicket gate shaft also carries a wicket gate lever 18 (Figs. 1 and 4) which is keyed at 20 (Figs. 2 and 4) to said wicket gate shaft. The wicket gate lever is in turn keyed to the shear lever by a shear pin 22.

When the gate operating ring is rotated by connecting rods 10, gate operating ring 6 in turn will move gate links 14 to rotate shear levers 16. The shear levers in turn rotate wicket gate levers 18 through shear pins 22 to rotate the wicket gate shafts. The shear pins are provided between shear levers 16 and wicket gate levers 18 to provide a safety device in case a wicket gate is prevented from rotating. When a wicket gate is prevented from rotating, the shear lever will shear the shear pin to prevent injury to the various linkage mechanisms. Inasmuch as shear lever 16 is loosely received by the wicket gate shaft, the shear lever will rotate relative to the wicket gate shaft when the shear pin has been sheared and will not interfere with movement of the gate operating ring.

The damping devices are mounted on a support 24 which may be the pump-turbine head cover deck. Each damping device may serve two wicket gates, or a damping device may be provided for each wicket gate, or two damping devices may be provided for each wicket gate when additional braking action is desired. The damping device comprises damping shoes movable into engagement with damping surfaces on the wicket gate shafts, means supporting the damping shoes for movement, and force means to move said damping shoes.

Damping shoes 26 are arcuate and have a surface complementary to the surface they engage. The damping shoes may be lined or unlined. Each damping shoe contacts a damping surface provided on the wicket gate shaft. The damping surface on the wicket gate shaft may comprise an integral surface on the wicket gate shaft, a separate surface securely fastened to the wicket gate shaft, or a surface integral with the wicket gate lever which is keyed to the wicket gate shaft. In the embodiment disclosed, the damping shoes engage surfaces 28 provided on wicket gate levers 18. The damping shoes are pivotally supported at each end.

Figure 4:
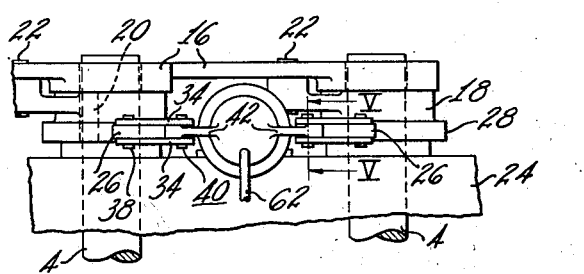
Fig. 4 is a view taken in the direction of arrows IV—IV of Fig. 1 illustrating a side view of the damping device.
Figure 5:
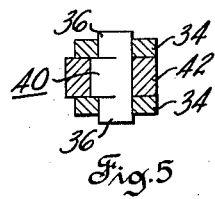
Fig. 5 is a view taken in the direction of arrows V—V of Fig. 4 of a section of the damping device.

The means which supports the damping shoes for movement may comprise two first links 30 (Figs. 2 and 3) and two second links 32; all of the links are pivotally mounted. Each first link 30 may comprise two members 34, 34 (Fig. 4) which are spaced to receive a damping shoe. Each first link is pivotally connected by pivot 38 to one end of the damping shoe. The other end of each first link is connected by pivot 40 to a support 42. Referring to Fig. 5, pivot 40, which connects the two members 34, 34 to the support, has eccentric projections 36 extending from each end. The eccentric projections are received in members 34, 34. By rotating the pivot, the eccentric projections will shift members 34, 34 to vary the effective length of the first link, and in turn the position of the damping shoe. The other ends of the damping shoes are connected together by the two second links 32 to form a toggle connection. Each individual second link (referring to Figs. 2 and 3) is connected by a pivot 44 to the other end of each damping shoe. The free ends of the second links are in turn connected together. One of the second links 32 may be provided with a yoke shaped end to receive a tongue of the other link, and the ends of both links connected together by pivot 46. Means is provided to move second links 32 to cause the damping shoes to move into engagement with the damping surface on the wicket gate shafts.

The means to move the second links may comprise any conventional force means. The embodiment disclosed comprises a fluid cylinder 48 (Figs. 2 and 3) which is mounted by fastening means 49 to support 24. A piston 50 movable in said cylinder carries piston rod 52 which is threadedly connected to head 54. A lock nut 56 is threaded along the piston rod to secure the head in position. The head is pivotally attached to the second links by a connecting link 58 which is pivotally connected at 60 to the head and pivotally connected to the second links by pivot 46. The second links extend obliquely from the piston rod to the damping brakes and form an included angle, which may be defined as the angle between the second links which is less than 180°. Fluid is admitted through tubing 62 into the fluid cylinder to move the piston. Air or oil pressure may be employed to move the piston to apply the damping shoes during the pumping cycle and may be supplied through conventional manually operated control valves or automatically through governor actuated controls (not shown). The damping shoes may be applied at full or reduced value, as required, during the opening or closing movement of the wicket gates. The damping shoes remain applied under full pressure during the entire period of time pumping takes place at any fixed gate opening.

Figure 2:
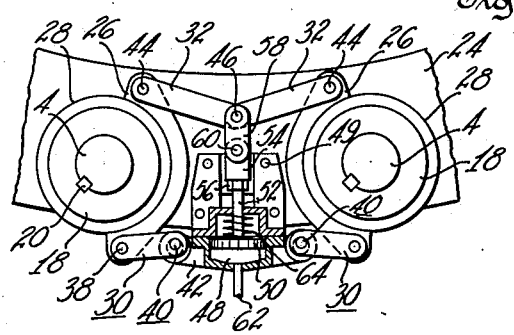
Fig. 2 is an enlarged view of a portion of Fig. 1 partially showing the damping shoes in engagement with the damping surfaces on the wicket gate shafts.
Figure 3:
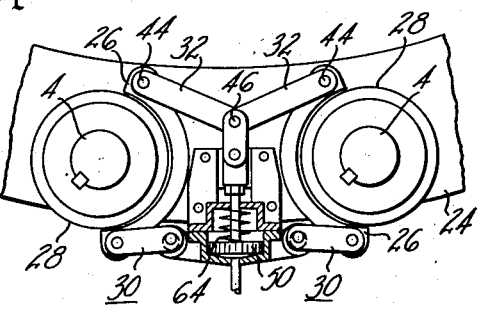
Fig. 3 is a view similar to Fig. 2 with the damping shoes out of engagement with the damping surfaces on the wicket gate shafts.

Referring to Figs. 2 and 3, the damping device operates in the following manner. When it is desired to apply the damping shoes to the damping surface on the wicket gate shafts to alleviate torsihonal flutter of the wicket gates, fluid is admitted through tubing 62 into hydraulic cylinder 48 to move piston rod 52 and in turn shift the second links. As the piston rod moves radially with respect to the axis of the gate operating ring, the included angle between the second links increases, or to put it in another way, the second links approach a normal position with respect to the piston rod. As the links are moved toward alignment, the damping shoes are caused to pivot about pivotal connection 38 and move into engagement with the damping surfaces on the wicket gate shafts. If a damping shoe is out of alignment with a damping surface on a wicket gate shaft, the damping shoe will also pivot about pivots 40 and 46 to align itself with the wicket gate shaft damping surface. When the damping shoes have moved into engagement with the damping surfaces on the wicket gate shafts (Fig. 2), the first and second links apply forces to the damping shoe tangentially to the ends of the damping shoes to lock the shoes rigidly against the damping surfaces. Means is provided to move the damping shoes out of engagement with the damping surfaces on the wicket gate shafts.

The means to move the damping shoes out of engagement with the damping surface on the wicket gate shafts may comprise a spring. Referring to Figs. 2 and 3, a spring 64 is carried within the fluid cylinder and abuts one side of the piston. When the piston moves to force the damping shoes into engagement with the damping surfaces, the spring is placed under compression. When it is desired to release the damping shoes, it is merely necessary to permit the fluid in the cylinder to exit through tube 62; the spring will expand and move the piston in an opposite direction to move the damping shoes out of engagement.

In summary: the first and second links apply forces that are tangential to the ends of the damping shoes, locking the damping shoes rigidly against the damping surface of the wicket gate shafts to restrain said wicket gate shafts from rotation in either direction. The amount of clearance in the brake linkage connections therefore is immaterial to the effectiveness of the damping shoes' action. The damping shoes are self-centering because the first links and the second links, in combination with the damping shoes, are unconstrained and can move to center the damping shoes with respect to the damping surfaces on the wicket gate shafts.

Although but a single embodiment of the present invention has been illustrated and described, it will be apparent to one skilled in the art that various changes and modifications may be made therein without departing from the spirit of the invention or from the scope of the appended claims.

What is claimed is:

1. An arrangement in a pump-turbine when operating as a pump, for preventing vibration of adjoining wicket gate shafts having damping surfaces, comprising: a support between said adjoining wicket gate shafts, two movable damping shoes, one of said damping shoes for each of said wicket gate shafts, an individual first link for each damping shoe, means pivotally connecting one end of one of said first links to an end of one of said damping shoes, means pivotally connecting one end of the other of said first links to an end of the other of said damping shoes, individual means pivotally connecting the other end of each of said first links to the support, an individual second link for each damping shoe, means pivotally connecting one end of one of said second links to the other end of one of said damping shoes, means pivotally connecting one end of the other second link to the other end of the other damping shoe, means pivotally connecting the free end of each of said second links together to form a common pivotal connection, said second links extending out of alignment from their common pivotal connection when said damping shoes are out of engagement with said damping surfaces, means connected to said common pivotal connection movable in a first direction, said means moving said links toward alignment to move said damping shoes into engagement with said damping surfaces, means to move said moving means in a direction opposite said first direction to move said damping shoes out of engagement with said damping surfaces, said first and second links applying substantially tangential forces to said damping shoes when they have been moved into engagement with said damping surfaces.

2. A device as set forth in claim 1 wherein the means which pivotally connects the ends of the first links to the support comprises rotatable eccentric pivots, said eccentric pivots rotatable to vary the effective length of said first links to change the position of said damping shoes.

3. An arrangement in a pump-turbine when operating as a pump, for preventing vibration of adjoining wicket gate shafts having damping surfaces, comprising: a support between said adjoining wicket gate shafts, two movable damping shoes, one of said damping shoes for each of said wicket gate shafts, an individual first link for each damping shoe, means pivotally connecting one end of one of said first links to an end of one of said damping shoes, means pivotally connecting one end of the other of said first links to the end of the other of said damping shoes, individual means pivotally connecting the other end of each of said first links to the support, an individual second link for each damping shoe, means pivotally connecting one end of one of said second links to the other end of one of said damping shoes, means pivotally connecting one end of the other second link to the other end of the other damping shoe, means pivotally connecting the free end of each of said second links together to form a common pivotal connection, said second links forming an included obtuse angle when the damping shoes are out of engagement with said damping surfaces, means connected to said common pivotal connection to move in a first direction to move said links to increase the size of the included obtuse angle to move said damping shoes into engagement with said damping surfaces, said first and second links applying forces substantially tangential to said damping shoes when said damping shoes have been moved into engagement with said damping surfaces, and means to move said moving means in a direction opposite said first direction to move said damping shoes out of engagement with said damping surfaces.

4. A device as set forth in claim 3 wherein the means which pivotally connects the ends of the first links to the support comprises rotatable pivots, said pivots having an eccentric projection received by said first links, said pivots rotatable to vary the effective length of said first links to change the position of said damping shoes.

5. An arrangement in a pump-turbine when operated as a pump, of a wicket gate shaft having a damping surface, and which is connected to a gate opening ring of a pump-turbine, comprising: a support adjacent said wicket gate shaft, a movable damping shoe adjacent said wicket gate shaft, a first link, means pivotally connecting one end of said first link to said damping shoe, means pivotally connecting the other end of said first link to said support, a second link, means pivotally connecting one end of said second link to said damping shoe, force means to move said second link carried by a support, means to move said force means in a radial direction with respect to the axis of said gate opening ring, means pivotally connecting the other end of said second link to said force means, said second link extending obliquely from said force means when said damping shoe is out of engagement, said force means moving said second link toward a normal position with respect to said force means to move said damping shoe into engagement with said damping surface on the wicket gate shaft, and means to move said force means to move said damping shoe out of engagement with said damping surface.

6. A device as set forth in claim 5 wherein said brake shoe is arcuate, said first and second links spaced with respect to each other so as to apply substantially tangential forces to said damping shoe when said damping shoe is in engagement with the damping surface on the wicket gate shaft.

7. An arrangement in a pump-turbine when operated as a pump, for preventing vibration of a wicket gate shaft having a damping surface, comprising: a support adjacent said wicket gate shaft, a movable damping shoe adjacent said wicket gate shaft, a first link, means pivotally connecting one end of said first link to said damping shoe, means pivotally connecting the other end of said first link to said support, a second link, means pivotally connecting one end of said second link to said damping shoe, rectilinearly movable force means carried by a support, means pivotally connecting said force means and said second link, said second link extending obliquely from said force means when said damping shoe is out of engagement with said damping surface, means to move said force means in a first direction to move said second link toward a normal position with respect to said force means to move said damping shoe into engagement with said damping surface on said wicket gate shaft, and means to move said force means in a direction opposite the first direction to move said damping shoe out of engagement with said damping surface.

References Cited in the file of this patent

UNITED STATES PATENTS

| 1,517,896 | Enz | Dec. 2, 1924 |
| 1,641,755 | Gross et al. | Sept. 6, 1927 |
| 2,277,255 | Rudert et al. | Mar. 24, 1942 |
| 2,436,372 | Avery | Feb. 24, 1948 |
| 2,687,280 | Sharp | Aug. 24, 1954 |

FOREIGN PATENTS

| 19,293 | Norway | Dec. 28, 1908 |